UNITED STATES PATENT OFFICE.

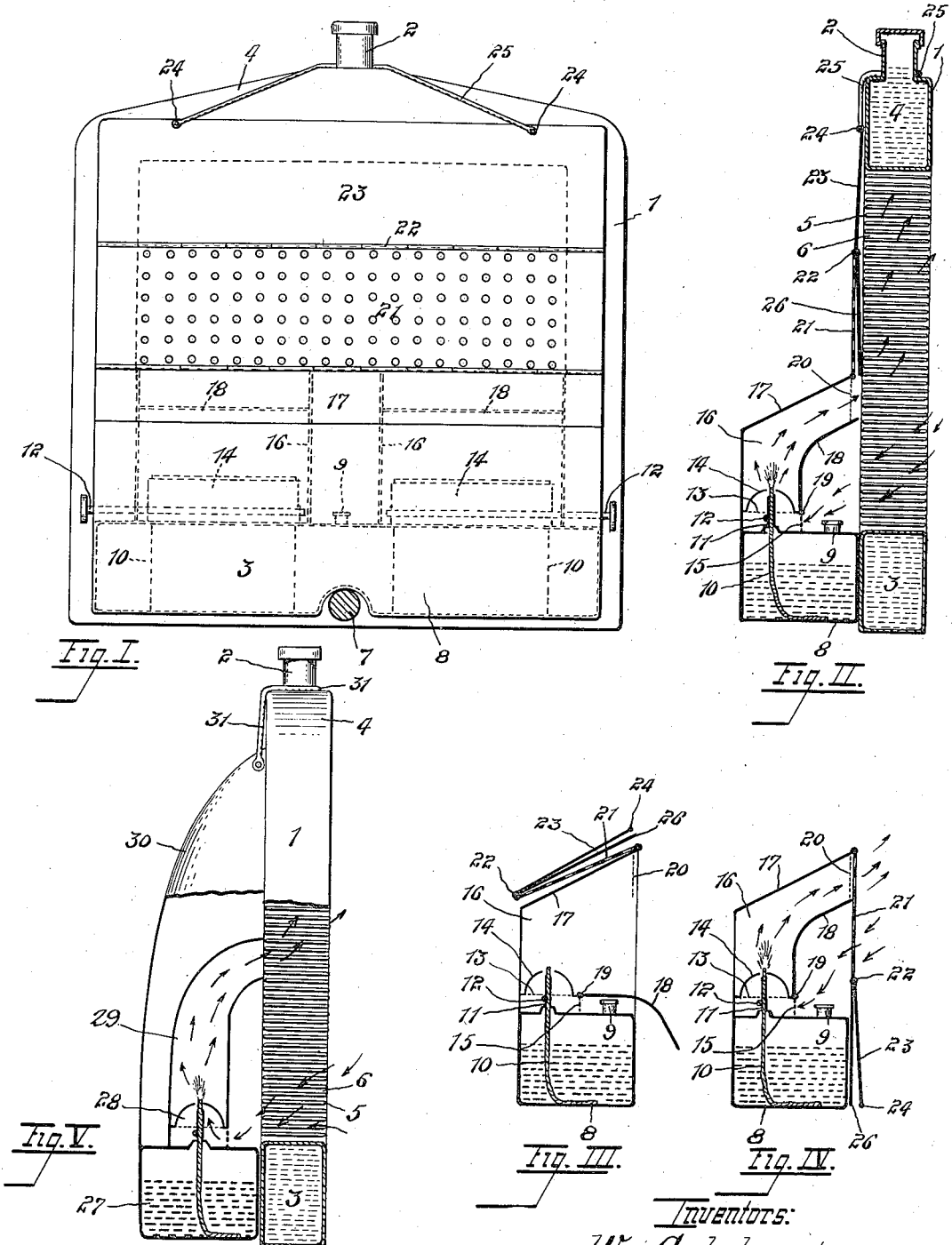

WILLIAM GILCHRIST AND RALPH W. DAYKIN, OF CLEVELAND, OHIO; SAID DAYKIN ASSIGNOR OF ONE-TENTH OF THE ENTIRE RIGHT TO MARTHA R. HOUSE, OF CLEVELAND, OHIO.

HEATER.

1,171,512.  Specification of Letters Patent.  Patented Feb. 15, 1916.

Application filed March 8, 1915. Serial No. 12,905.

*To all whom it may concern:*

Be it known that we, WILLIAM GILCHRIST and RALPH W. DAYKIN, citizens of the United States, residing at 28 Knowles and 13814 Idarose streets, respectively, in the city of Cleveland and State of Ohio, have invented a new and useful Improvement in Heaters, of which the following is a specification, the principle of the invention being herein explained and the best mode in which we have contemplated applying that principle, so as to distinguish it from other inventions.

Our invention appertains to a heater and more particularly to a device adapted to effectively furnish heat either to the water in the radiator or to the seating inclosure of an automobile.

It is desirable to keep the water in the radiator of an automobile heated while the latter is stationary in a freezing temperature. Obviously, it is advantageous to accomplish this with a device that is suited for use with any make of car, and which is readily attached or detached as the occasion may require. When the machine is running and hence the radiator use of our invention unnecessary it is preferable to have the distinctive forward design of the automobile unaltered. Our manufacture may be entirely removed to exercise its alternative function elsewhere.

Accordingly, the objects we have had in mind are: (1) The provision of a structure which is simple, compact and economical both of manufacture and in operation. (2) To build a heater which may be so carried in front of the radiator as to completely shut off the access of exterior cold air. (3) The designing of a partly collapsible heater. (4) To utilize the radiating surfaces as heat deflectors or distributers thereby taking avail of the reversibility in function from cooling to heating surfaces. (5) The construction of a heater which is explosion proof.

The inventive conception is associated with elements which are hereinafter explained and variously combined in the claims.

While the annexed drawing and particular description thereof set forth the preferred form embodying our invention, it should be understood that the means merely exemplify many diversified mechanical forms with which the principle of our invention may be properly applied.

Figure I is a front elevation of the radiator of an automobile showing our invention associated therewith. Fig. II is a vertical section of the same. Fig. III is a side elevation of the heater embodying the preferred exemplification removed from the radiator, and with various parts in altered positions. Fig. IV is a view corresponding to Fig. II showing certain parts in an altered position whereby the alternative function of our heater may be exercised. Fig. V is a part side elevation part section of a modified form of our invention.

We are familiar with the disclosures, among others, of the United States patents issued in 1904 to Brock, No. 774,556, in 1914 to Richardson, No. 1,103,840, and in 1915 to Knudsen, No. 1,124,462.

In the drawing the frame of the radiator of an automobile has been designated by the numeral 1, and its capped inlet by the numeral 2. The lower water chamber 3 communicates with the upper water chamber 4 through the series of conduits 5 with interposed radiating air surfaces 6. The end of the protruding crank shaft 7 also appears in Fig. I for a reason which will be directly recited.

Our inventive improvement proper consists of an elongated fuel tank 8 below, which extends substantially across the radiator, and has a flat rearwardly disposed surface. The middle portion of this tank may be upwardly recessed for the reception of the crank shaft 7 whereby a lower guide or support for our heater as a whole is afforded, and the same furthermore permitted to assume a lower and more effective position than it otherwise could. A pair of lamps draw upon this tank for fuel and inasmuch as they are exactly alike the singular number will be employed in describing them. The tank 8 is provided with a supply inlet 9 and near each end with a pair of wicks 10 projecting up through suitable wick supports 11 whereby the movement of the wick may be controlled in the usual manner by means of a friction stem 12. Slightly above is seen a gauze partition 13 over which a stool 14 is mounted to constitute a burner for the lamp. The air required for the purpose of combustion is drawn through perforations 15 on the rear side of the burner. An angular chimney extends upwardly a given distance above the burner and then upwardly and rearwardly to have its outlet in substantially the same vertical plane as the flat rear side of the tank 8 which was earlier specified. The chimney includes fixed sides 16 and an upwardly inclined top 17. The under side 18 is however, pivoted to the burner at 19 in order to permit of its being swung downwardly as appears in Fig. III and afford manual access to the burner. The chimney outlet is also provided with a gauze partition 20 suitably supported between the sides 16 and top 17. The provision of the gauze partitions 13 and 20 makes our heater explosion proof upon the principle of a miner's lamp.

Pivotally carried upon the upper edges of the pair of chimney tops 17 is a rigid grille member 21, and in turn pivotally mounted across the upper edge 22 thereof is a sheet metal plate 23. This latter is provided with a pair of studs 24 which are attached to a flexible suspension member 25 adapted to be hung about the upwardly projecting inlet 2 as is shown in Fig. I. Likewise pivotally carried across the upper edge of the grille at 22 is another sheet metal plate 26 adapted gravitationally to occupy a position rearwardly of the grille 21 when our heater construction in its entirety is supported in operative position against the front side of an automobile radiator. In such position the plate 26 serves to close the apertures in the grille 21 as is clearly seen in Fig. II; while the plate 23 coöperates therewith to effect an absolute closure for the front of the radiator after the manner indicated in Fig. I. Heat traveling through the chimney is compelled to be distributed over the radiating surfaces and permitted to pass through the radiator itself into the confines of the engine hood. It is manifest that during this time the normal cooling function of the radiating surfaces is reversed such that their configuration is utilized to effectively disseminate the heat.

One of the features of our invention is its ready adaptation to the alternative function of supplying heat to any portion of the interior of the automobile body. By contriving the upper half of the entire height of the heater so as to have it fold against the lower half the advantage is gained of reducing the heater to half the size in respect to dimension of height, and this permits it to be readily accommodated in a suitable compartment beneath either seat of an automobile. When intended for the alternative use just suggested the grille 21 and pair of plates 23 and 26 are all swung downwardly so as to be gravitationally suspended from the upper edges of the chimney tops 17. Such position is clearly shown in Fig. IV and attention is directed to the circumstance that the grille 21 not only does not obstruct the chimney outlet but incidentally serves as a protection for the gauze partition 20. The relation of the parts as assumed in either Figs. III or IV will be seen to be quite compact.

The modification depicted in Fig. V comprises a fuel tank 27, a burner construction designated in its entirety as 28, an integral upwardly and rearwardly directed chimney 29 and a rigid overall closure 30 supported in similar manner through a suspension agency 31. This form of our invention while in no sense collapsible, is nevertheless a simple, feasible and economical heater which may be readily attached or detached to any of the standard types of radiator fronts now known to the market.

We claim:

1. A heater of the class described comprising heating means, a conduit in communication therewith and having a laterally directed outlet, a perforate member pivotally mounted upon the upper edge of said outlet, and a plate pivotally mounted upon the upper edge of said member.

2. A heater of the class described comprising a chimney having a laterally directed outlet, heating means below, and a member pivotally mounted upon said chimney and adapted to swing across the outlet of the latter.

3. A heater of the class described comprising a casing, a conduit therein having an inlet below and provided above with a laterally directed outlet, heating means below the inlet of said conduit, and a suspension member pivotally attached over said outlet and adapted to swing with reference to the plane thereof for the purpose specified.

4. A heater of the class described comprising a casing having a side outlet, heating means below; and a pair of coöperating members pivotally mounted above said outlet and adapted to lie in substantial alinement with said opening.

5. A heater of the class described comprising a casing having one flat side, heating means below, a chimney in communication therewith and opening through the top of said flat side, a grille pivotally connected above said opening, and a pair of plates each pivotally connected to the free end of said grille, one of said plates being provided with suspension means.

6. A heater of the class described comprising in combination with an automobile radiator, of a casing closing a lower portion of the front thereof, heating means within said casing, and a device movably attached at the rear of said casing, said device being of a form to extend upwardly or downwardly whereby to either close the upper portion of said radiator front or rest alongside said casing.

7. A heater of the class described comprising in combination with an automobile radiator having open air passages, of a casing fitting against a lower portion of the front thereof, heating means within said casing, a chimney for the latter having an outlet opposed to said air passages, and a device including perforate and imperforate members pivotally connected to the top of said casing and to each other, said members being adapted to extend upwardly or hang whereby to either together close the upper portion of said radiator front or hang extended from said casing.

8. A heater of the class described comprising in combination with an automobile radiator having air passages extending therethrough; of a casing fitted against the lower front portion of said radiator, heating means within said casing, the latter provided with a draft outlet opposed to such lower front portion, an extension device coacting with the casing to fit against and close the complementary portion of said radiator front, said device being furthermore adapted to lie against one surface of said casing.

9. A heater of the class described comprising heating means, a conduit in communication therewith and having a laterally directed outlet, a member having apertures and pivotally mounted upon the upper edge of said outlet, and means for closing said apertures.

10. A heater of the class described comprising a casing, heating means below and in the forward half of said casing, the latter being formed with a bent chimney above said heating means and leaving its upper end extended rearwardly, and a door in said chimney.

11. A heater of the class described comprising a casing having a rear side adapted to conform to a part of the exposed front surface of an automobile radiator, a source of heat within such casing, and a coöperating member movably attached at said rear side and adapted to line substantial alinement therewith.

12. A heater of the class described comprising a casing provided below with a recess adapted to inclose the crank shaft of an automobile, a suspension member above, heating means in communication with said casing, the front of said casing being permanently closed, and a rearwardly directed chimney for the purpose specified.

13. A heater of the class described comprising in combination with a radiator having air passages of a casing having a substantially flat side and closing the lower half of said radiator, heating means below, a chimney communicating with the latter and opening through said flat side, and a suspension device attached near the upper end of said flat side and coacting therewith to close the upper half of said radiator.

14. A heater of the class described comprising a casing, heating means below and in the forward half of said casing, the latter being formed with a bent chimney above said heating means and having its upper end extended rearwardly and constricted relative to the size of said casing, and a gauze partition across one end of said chimney.

15. A heater of the class described comprising a casing having a rear outlet, heating means in communication below with said casing, and a plurality of members movably carried at the rear of said casing and adapted to be elevated or suspended below with respect to the top thereof, the arrangement being such that the relation of said members to each other may be varied whereby one functionates in the elevated position and the other in the suspended position.

16. A heater of the class described comprising in combination with an automobile radiator, of a casing having a rear opening fitted against a lower portion of the front of said radiator, heating means within said casing, and a device including perforate and imperforate portions and connected to said casing, said device being adapted to extend upwardly or hang whereby such portions entirely close the upper portion of said radiator front or partially close the rear opening of said casing.

17. A heater of the class described comprising in combination with a radiator front having air passages, of a casing having a rear side conforming to and closing a lower portion of said radiator front, heating means below, a chimney communicating with the latter and opening through said rear side, and a device adapted to be located above the upper end of said rear side and coacting therewith to close the upper portion of said radiator front.

Signed by us, this 23rd day of February, 1915.

WILLIAM GILCHRIST.
RALPH W. DAYKIN.

Attested by—
D. E. MOOK,
CURT B. MUELLER.